(12) United States Patent
Junk et al.

(10) Patent No.: US 10,662,273 B2
(45) Date of Patent: May 26, 2020

(54) WATERBORNE ACRYLIC DISPERSIONS WITH HIGH BIORENEWABLE CONTENT

(71) Applicant: CELANESE INTERNATIONAL CORPORATION, Irving, TX (US)

(72) Inventors: Matthias Junk, Mainz (DE); Stephan Krieger, Hofheim (DE); Thomas Fichtner, Dalheim (DE)

(73) Assignee: CELANESE INTERNATIONAL CORPORATION, Irving, TX (US)

(*) Notice: Subject to any disclaimer, the term of this patent is extended or adjusted under 35 U.S.C. 154(b) by 0 days.

(21) Appl. No.: 15/383,943

(22) Filed: Dec. 19, 2016

(65) Prior Publication Data
US 2018/0171051 A1    Jun. 21, 2018

(51) Int. Cl.
| | | |
|---|---|---|
| *C08F 220/18* | (2006.01) | |
| *C08L 33/12* | (2006.01) | |
| *C08L 33/10* | (2006.01) | |
| *C08L 33/06* | (2006.01) | |
| *C09D 133/12* | (2006.01) | |
| *C09D 133/10* | (2006.01) | |
| *C09D 133/06* | (2006.01) | |
| *C09D 7/61* | (2018.01) | |
| *C09D 5/02* | (2006.01) | |
| *C09D 133/02* | (2006.01) | |
| *C09D 143/04* | (2006.01) | |
| *C08F 2/26* | (2006.01) | |
| *C09D 133/24* | (2006.01) | |
| *C08K 3/26* | (2006.01) | |
| *C08K 3/34* | (2006.01) | |

(52) U.S. Cl.
CPC ........... *C08F 220/18* (2013.01); *C08F 2/26* (2013.01); *C08L 33/068* (2013.01); *C08L 33/10* (2013.01); *C08L 33/12* (2013.01); *C09D 5/02* (2013.01); *C09D 7/61* (2018.01); *C09D 133/02* (2013.01); *C09D 133/068* (2013.01); *C09D 133/10* (2013.01); *C09D 133/12* (2013.01); *C09D 133/24* (2013.01); *C09D 143/04* (2013.01); *C08F 220/1808* (2020.02); *C08K 3/34* (2013.01); *C08K 2003/265* (2013.01); *C08K 2003/267* (2013.01); *C08L 2201/54* (2013.01)

(58) Field of Classification Search
CPC .................................................. C08F 220/18
See application file for complete search history.

(56) References Cited

U.S. PATENT DOCUMENTS

| | | |
|---|---|---|
| 3,283,036 A | 11/1966 | Larson |
| 3,687,885 A | 8/1972 | Abriss et al. |
| 3,879,314 A | 4/1975 | Gunning et al. |
| 4,572,869 A | 2/1986 | Wismer et al. |
| 4,616,074 A | 10/1986 | Ruffner |
| 4,806,590 A | 2/1989 | Padget et al. |
| 6,610,776 B2 | 8/2003 | Laubender et al. |
| 8,034,871 B2 | 10/2011 | Bochnik et al. |
| 8,889,783 B2 | 3/2014 | Hayes |
| 9,000,069 B1 | 4/2015 | Mackulin et al. |
| 9,422,411 B2* | 8/2016 | Sahouani ............... A01N 47/44 |
| 2004/0034158 A1 | 2/2004 | Reuter et al. |
| 2005/0004318 A1 | 1/2005 | Ohshiro et al. |
| 2007/0093576 A1 | 4/2007 | Albrecht et al. |
| 2007/0135567 A1 | 6/2007 | Ruhoff et al. |
| 2007/0154646 A1 | 7/2007 | Bochnik et al. |
| 2009/0018300 A1 | 1/2009 | Bloom et al. |
| 2011/0282000 A1* | 11/2011 | Hayes ................... C08F 220/10 524/553 |
| 2011/0306727 A1 | 12/2011 | Grablowitz et al. |
| 2013/0065279 A1 | 3/2013 | Burk et al. |
| 2014/0018473 A1 | 1/2014 | Ratering et al. |
| 2014/0058031 A1 | 2/2014 | Overbeek |
| 2014/0065435 A1 | 3/2014 | Overbeek |
| 2014/0093727 A1* | 4/2014 | Richter ...................... C08F 2/54 428/355 R |
| 2014/0323635 A1 | 10/2014 | Yang et al. |
| 2016/0009628 A1 | 1/2016 | Colby et al. |
| 2016/0152751 A1* | 6/2016 | Linemann ............... C04B 26/06 524/561 |
| 2016/0312080 A1* | 10/2016 | Richter ................ C07D 203/08 |
| 2017/0313912 A1* | 11/2017 | Zhou ...................... C09J 7/0285 |
| 2018/0037783 A1* | 2/2018 | Talamoni ................ C09J 133/08 |

FOREIGN PATENT DOCUMENTS

| | | |
|---|---|---|
| EP | 2873706 A1 | 5/2015 |
| WO | 2012130762 | 10/2012 |
| WO | 2014207389 A1 | 12/2014 |
| WO | 2015164087 A1 | 10/2015 |
| WO | 2016128574 A1 | 8/2016 |

* cited by examiner

*Primary Examiner* — Megan McCulley

(74) *Attorney, Agent, or Firm* — Roberts Calderon Safran & Cole P.C.

(57) ABSTRACT

An aqueous copolymer dispersion is formed by emulsion polymerization of a monomer mixture comprising (a) 20 to 80 wt. % of one or more (meth)acrylic acid esters A, whose homopolymer(s) have a $T_g > 25°$ C. and at least one has a biorenewable carbon content of at least 50 wt. % of the total carbon content of the ester; (b) 19 to 79 wt. % of one or more (meth)acrylic acid esters B whose homopolymer(s) have a $T_g < 25°$ C.; (c) 0.5 to 10 wt. % of at least one monomer selected from unsaturated sulfonic, phosphoric and phosphonic acids, and unsaturated carboxylic acids, anhydrides and amides thereof; (d) up to 10% by weight of one or more functional monomers selected from hydrolysable silane compounds, epoxy-containing compounds, ureido-containing compounds and carbonyl-containing compounds, and (e) less than 5 wt. % of one or more further monomers, wherein the total percentages of comonomers (a) to (e) equals 100%.

22 Claims, No Drawings

WATERBORNE ACRYLIC DISPERSIONS WITH HIGH BIORENEWABLE CONTENT

FIELD

The present development relates to waterborne acrylic dispersions with high biorenewable content and their use in coating compositions, particularly in paints and plasters.

BACKGROUND

Waterborne acrylic dispersions are well known as binders in the production of coating compositions such as plasters, renders, and paints. Advantages of using waterborne systems for such applications include low cost, ease of application and cleanup, reduced drying times, and low or no odor or emissions of volatile organic compounds (VOC). Currently, most acrylic dispersions are produced using monomers derived from oil based sources, i.e., fossil fuels. However, the movement toward environmental sustainability has provided an impetus for the development of copolymers utilizing as much raw material fitting within a sustainable framework as possible. For example, the LEED Green Building Rating System® requires that materials incorporate 5% of rapidly renewable materials. Providing binders or coatings that can be utilized in building materials to help meet the requirements of the LEED Green Building Rating System® would be beneficial to the environment. However, it is also important that the binders or coatings maintain or even improve the properties that make them beneficial for their particular use.

For example, US Patent Application Publication No. 2014/0065435 discloses an aqueous polymer dispersion comprising a vinyl polymer with at least two phases comprising: A) 40 to 90 wt. % of a vinyl polymer A having a glass transition temperature in the range of from −50 to 30° C.; and B) 10 to 60 wt. % of a vinyl polymer B having a glass transition temperature the range of from 50 to 130° C.; wherein vinyl polymer A comprises 0.1 to 10 wt. % of at least one acid-functional olefinically unsaturated monomer, wherein at least 20 wt. % of the monomer composition used to form vinyl polymer A and vinyl polymer B is derived from at least one bio-renewable olefinically unsaturated monomer. Examples of suitable bio-renewable monomers are said to include (meth)acrylic acid and alkyl (meth) acrylate, where alkyl is preferably selected from methyl, ethyl, butyl or 2-ethylhexyl. The aqueous polymer dispersion is reported to be useful in coating compositions having an advantageous combination of a low minimum film forming temperature (MFFT) and good anti-blocking properties.

Similarly, US Patent Application Publication No. 2014/0058031 discloses an aqueous polymer coating composition comprising at least: a vinyl polymer A having a weight average molecular weight $M_w$ within the range of from 1,000 to 150,000 g/mol and an acid value >5 mg KOH/g; and a vinyl polymer B having a weight average molecular weight of at least 80,000 g/mol and an acid value <35 mg KOH/g; wherein I) the wt. % of olefinically unsaturated monomers used to form polymer A and polymer B are in the ratio of 5:70 to 95:30 and add up to 100%; II) at least 20 wt. % of at least one of polymer A and or polymer B is derived from at least one bio-renewable olefinically unsaturated monomer. In addition to (meth)acrylic acid and alkyl (meth) acrylates, suitable bio-renewable monomers are said to include α-methylene butyrolactone, α-methylene valerolactone, α-methylene γ-$R^1$ butyrolactone (wherein $R^1$ can be alkyl or aryl); itaconates such as dialkyl itaconates and monoalkyl itaconates, itaconic acid, itaconic anhydride, crotonic acid and alkyl esters thereof, citraconic acid and alkyl esters thereof, methylene malonic acid and its mono and dialkyl esters, citraconic anhydride, mesaconic acid and alkyl esters thereof. Improved properties are said to include heat resistance, colloidal stability, pigment compatibility, surface activity, blocking resistance and reduced MFFT depending on the monomers used.

U.S. Pat. No. 8,889,783 discloses a binder or coating composition comprising: (A) a copolymer derived from monomers comprising: a vinyl aromatic monomer; a second monomer selected from the group consisting of butadiene, alkyl acrylates, alkyl methacrylates, and mixtures thereof; and a biobased monomer, wherein the copolymer has a biobased carbon content of 10 to 95 weight percent, based on the weight of the copolymer, and the median particle size of the copolymer is 80 nm to 200 nm; and (B) a coating pigment, mineral filler, or mixture thereof, wherein the coating pigment, mineral filler, or mixture thereof is present in an amount of 60 to 90 weight percent, based on the weight of the binder or coating composition. Examples of biobased monomers include isobornyl acrylate, isobornyl methacrylate, tetrahydrofurfuryl acrylate, tetrahydrofurfuryl methacrylate, lauryl acrylate, lauryl methacrylate, and mixtures thereof. The coating compositions are described as being useful as paper coatings, carpet backing, paints, surface coatings, and binders.

International Patent Publication No. WO 2016/128574 A1 discloses an aqueous polymer emulsion comprising at least 30 wt. % of a vinyl copolymer (A), said vinyl copolymer comprising: (I) from 10 to 90 wt. % of 2-octyl acrylate monomer; (II) from 10 to 90 wt. % of at least one itaconate ester monomer according to formula (1):

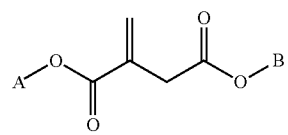

in which A and B may be different or the same and A and B are independently methyl or ethyl; and (III) from 0 to 80 wt. % of ethylenically unsaturated monomer other than (I) and (II); whereby the summed amount of (I), (II) and (III) is 100 wt. % and whereby the amount of vinyl copolymer (A) is given relative to the total weight amount of the polymers present in the emulsion. The itaconate ester monomer according to formula (1) can be produced from biobased itaconic acid and the polymer emulsion is reported to give coatings with a high water resistance.

According to the present invention, it has now been found that an acrylic polymer dispersion produced from a specific combination of a hard meth (acrylic acid) ester with high biorenewable content, a soft meth (acrylic acid) ester and an acidic comonomer can be used as binder for paints and coatings to provide excellent wet scrub resistance and outdoor performance.

SUMMARY

Thus, in one aspect, the invention resides an aqueous copolymer dispersion comprising at least one copolymer formed by emulsion polymerization of a monomer mixture comprising (or consisting essentially of or consisting of):

(a) 20 to 80% by weight of one or more acrylic and/or methacrylic acid esters A, whose homopolymer(s) have a glass transition temperature, $T_g$, greater than 25° C. and at least one of which has a biorenewable carbon content of at least 50% by weight of the total carbon content of the ester;

(b) 19 to 79% by weight of one or more acrylic and/or methacrylic acid esters B whose homopolymer(s) have a glass transition temperature, $T_g$, less than 25° C.;

(c) 0.5 to 10% by weight of at least one monomer selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof;

(d) up to 10% by weight of one or more functional monomers selected from the group of hydrolysable silane compounds, epoxy-containing compounds, ureido-containing compounds and carbonyl-containing compounds, and (e) optionally one or more further monomers copolymerizable with the (meth)acrylic esters A and B in an amount less than 5%, preferably less than 2.5%, more preferably less than 1%, by weight, wherein the total percentages of the comonomers (a) to (e) add up to 100%.

In a further aspect, the invention resides in a coating composition, particularly an interior paint, exterior paint or plaster comprising the aqueous copolymer dispersion described herein.

DETAILED DESCRIPTION

The present invention relates to an aqueous acrylic-based copolymer dispersion with a high biorenewable content and its use in coating compositions, and particularly in paints and plasters. The copolymer dispersion comprises water and at least one copolymer formed by emulsion polymerization of a monomer mixture comprising (a) 20 to 80% by weight of one or more acrylic and/or methacrylic acid esters A, whose homopolymer(s) have a glass transition temperature, $T_g$, greater than 25° C.; (b) 19 to 79% by weight of one or more acrylic and/or methacrylic acid esters B, whose homopolymer(s) have a glass transition temperature, $T_g$, less than 25° C.; (c) 0.5 to 10% by weight of at least one acidic monomer, (d) optionally up to 10% by weight of one or more functional monomers, and (e) optionally less than 5 wt. % of one or more further monomers copolymerizable with the (meth)acrylic esters A and B, wherein the total percentages of the comonomers (a) to (e) add up to 100%. At least one acrylic and/or methacrylic acid ester A has a biorenewable carbon content of at least 50% by weight of the total carbon content of the ester and in some aspects at least one acrylic and/or methacrylic acid ester B also has a biorenewable carbon content of at least 50% by weight of the total carbon content of the ester.

As used herein, the term "biorenewable (or biobased) carbon" is intended to mean carbon obtained from a biological source rather than a fossil oil based source. The biorenewable carbon of a monomer, a copolymer, or a copolymer composition can be determined using a method such as described in ASTM D6866-16 and ISO 16620. ASTM D6866-16 and ISO 16620-2 provide three different methods for determining the biorenewable content of a solid, liquid, or gaseous composition. For example, the compositions described herein can be dried as a film and tested as a solid. As defined by ASTM D6866-16 and ISO 16620-1, the biobased carbon content is the amount of biobased carbon in the material or product as a percent of the weight (mass) of the total organic carbon in the product. In particular, ASTM D6866-16 Method B measures the ratios of $^{14}C/^{12}C$ and $^{13}C/^{12}C$ in the composition using Accelerator Mass Spectrometry (AMS) and Isotope Ratio Mass Spectrometry (IRMS). Fossil based carbon contains essentially no $^{14}C$ because its age is much greater than the 5,730 year half-life of $^{14}C$. Thus, the presence and level of $^{14}C$ in a composition provides a direct measure of the amount of carbon that originated from a source other than a fossil fuel, i.e., the level of biobased carbon in the composition. If the biobased carbon contents of all raw materials in a mixture are known, it is also possible to calculate the biobased carbon content of the mixture according to ISO 16620-1.

The $T_g$ values for the homopolymers of the majority of monomers are known and are listed for example in Ullmann's Encyclopedia of Industrial Chemistry, volume A21, page 169, 5th edition, VCH Weinheim, 1992. $T_g$ values for statistical copolymers can then be calculated using the Fox equation, $1/T_g = w_1/T_{g,1} + w_2/T_{g,2} + \ldots + w_n/T_{g,n}$, where $w_1$, $w_2$, ..., $w_n$ are the weight fractions of monomers 1, 2, ..., n, and $T_{g,1}$, $T_{g,2}$, ..., $T_{g,n}$ are the glass transition temperatures of their respective homopolymers (in Kelvin). Alternatively and preferably, the $T_g$ values of the copolymers can be determined by differential scanning calorimetry (DSC) according to ISO 16805.

Acrylic and/or Methacrylic Acid Ester A

Any acrylic or methacrylic acid ester which, when polymerized, gives a homopolymer having a $T_g$ value greater than 25° C., preferably greater than 50° C., can be used as the, or one of the, ester(s) A. Examples of suitable esters A include isobornyl acrylate, isobornyl methacrylate, methyl methacrylate, ethyl methacrylate, isopropyl methacrylate, isobutyl methacrylate, tert-butyl methacrylate, tert-butyl acrylate, n-propyl methacrylate, isobutyl methacrylate and cyclohexyl methacrylate.

At least one, and in some embodiments, all of ester A has a biorenewable carbon content of at least 50%, such as at least 60%, for example at least 70%, such as at least 80%, for example at least 90 wt %, even up to 100%, by weight of the total carbon content of the ester. Preferred examples of esters which have homopolymers with a $T_g$ value greater than 25° C. and which are commercially available with a biobased carbon content ≥50% according to ISO 16620-1 include isobornyl acrylate, isobornyl methacrylate and mixtures thereof.

It will be appreciated that mixtures of esters, some formed from fossil fuel sources and others formed from biobased sources, can be used as the component A of the present monomer mixture.

The ester(s) A comprise from 20 to 80% by weight, more preferably from 25 to 75% by weight, most preferably from 30 to 70% by weight, of the monomer composition used to produce the copolymer dispersion described herein.

Acrylic and/or Methacrylic Acid Ester B

Any acrylic or methacrylic acid ester which, when polymerized, gives a homopolymer having a $T_g$ value less than 25° C., preferably less than 0° C., can be used as the, or one of the, ester(s) B. Examples of suitable esters B include methyl acrylate, ethyl acrylate, n-propyl acrylate, isopropyl acrylate, n-butyl methacrylate, n-butyl acrylate, isobutyl acrylate, 1-hexyl acrylate, 2-ethylhexyl acrylate, heptyl acrylate, n-octyl acrylate, 2-octyl acrylate, dodecyl methacrylate, dodecyl acrylate, tridecyl methacrylate, methacrylic ester 17.4, and mixtures thereof.

In some embodiments, at least one, and in some embodiments all of, ester B has a biorenewable carbon content of at least 50%, such as at least 60%, for example at least 70%, such as at least 80%, for example at least 90 wt %, even up to 100%, by weight of the total carbon content of the ester. Preferred examples of esters which have homopolymers with a $T_g$ value less than 25° C. and which are commercially available with a biobased carbon content ≥50% according to ISO 16620-1 include 2-octyl acrylate, n-dodecyl methacrylate, n-dodecyl acrylate, tridecyl methacrylate, methacrylic ester 17.4, and mixtures thereof, with 2-octyl acrylate being particularly preferred.

The ester(s) B comprise from 19 to 79% by weight, more preferably from 24 to 74% by weight, most preferably from 29 to 69% by weight, of the monomer composition used to produce the copolymer dispersion described herein.

Acidic Monomers (c)

In addition to the acrylic and/or methacrylic acid esters A and B, the monomer mixture used to produce the aqueous copolymer dispersion described herein comprises 0.5 to 10% by weight of at least one monomer selected from the group consisting of ethylenically unsaturated sulfonic acids, ethylenically unsaturated phosphonic or phosphoric acids, and ethylenically unsaturated carboxylic acids, as well as anhydrides and amides thereof.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid.

Examples of suitable ethylenically unsaturated phosphonic or phosphoric acids include vinylphosphonic acid, esters of phosphonic or phosphoric acid with hydroxyalkyl(meth)acrylates and ethylenically unsaturated polyethoxyalkyletherphosphates.

In addition to or instead of said acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Suitable ethylenically unsaturated carboxylic acids comprise ethylenically unsaturated $C_3$-$C_8$ monocarboxylic acid and/or an ethylenically unsaturated $C_4$-$C_8$ dicarboxylic acid, together with the anhydrides or amides thereof. Examples of suitable ethylenically unsaturated $C_3$-$C_8$ monocarboxylic acids include acrylic acid, methacrylic acid and crotonic acid. Examples of suitable ethylenically unsaturated $C_4$-$C_8$ dicarboxylic acids include maleic acid, fumaric acid, itaconic acid and citraconic acid.

Preferred are acidic monomers with a biobased carbon content of at least 50%, such as, e.g., itaconic acid and citraconic acid.

Functional Comonomers (d)

Optionally, the monomer mixture used to produce the aqueous copolymer dispersion described herein may also contain up to 10% by weight, such as from 0.5 to 5% by weight, of one or more functional monomers adapted to promote better film or coating performance by the final coating composition. Such desirable film/coating properties can include, for example, enhanced adhesion to surfaces or substrates, improved wet adhesion, better resistance to removal by scrubbing or other types of weathering or abrasion, and improved resistance to film or coating cracking. The optional co-monomers useful for incorporation into the emulsion copolymers of the compositions herein are those which contain one polymerizable double bond along with one or more additional functional moieties. Such optional or auxiliary co-monomers can include unsaturated silane co-monomers, glycidyl co-monomers, ureido co-monomers, carbonyl-functional monomers and combinations of these auxiliary optional co-monomers.

Unsaturated silanes useful as optional co-monomers can generally correspond to a substituted silane of the structural Formula I:

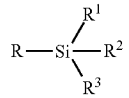

Formula I in which R denotes an organic radical olefinically unsaturated in the 0-position and $R^1$ $R^2$ and $R^3$ which may be identical or different, denote the group —OZ, Z denoting hydrogen or primary or secondary alkyl or acyl radicals optionally substituted by alkoxy groups. Suitable unsaturated silane compounds of Formula I are preferably those in which the radical R in the formula represents an w-unsaturated alkenyl of 2 to 10 carbon atoms, particularly of 2 to 4 carbon atoms, or an w-unsaturated carboxylic acid ester formed from unsaturated carboxylic acids of up to 4 carbon atoms and alcohols of up to 6 carbon atoms carrying the Si group. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinyltrimethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as optional functional co-monomers to impart epoxy-functionality to the emulsion copolymer. Examples of suitable glycidyl optional co-monomers include glycidyl acrylate, glycidyl methacrylate, allyl glycidyl ether, and vinyl glycidyl ether.

Another type of functional co-monomer comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

Other suitable functional co-monomers include unsaturated compounds that contain one or more carbonyl moieties. Examples of such suitable co-monomers include diacetone acrylamide (DAAM), polymerizable 1,3-dicarbonyl compounds and polymerizable 1,3-diketoamides. Suitable polymerizable 1,3-dicarbonyl compounds include acetoacetoxyethyl acrylate, acetoacetoxyethyl methacrylate (AAEM), acetoacetoxypropyl methacrylate, acetoacetoxybutyl methacrylate, 2,3-di(acetoacetoxy)propyl methacrylate and allyl acetoacetate. Such monomers are known to impart improved wet adhesion properties to coating compositions, especially on alkyd substrates (See DE 2535372

A1). Suitable polymerizable 1,3-diketoamides include those compounds described in U.S. Pat. No. 5,889,098, which patent is incorporated herein by reference. Examples of compounds of this type include amido acetoacetonates such as 3-isopropenyl-α,α-dimethylbenzyl amidoacetoacetate, 4-isopropenyl-α,α-dimethylbenzyl amidoacetoacetate, 4-ethylenyl-phenyl amidoacetoacetate and the like.

Further Comonomers (e)

Optionally, the monomer mixture used to produce the aqueous copolymer dispersion described herein may also contain one or more further monomers copolymerizable with the (meth)acrylic esters A and B, provided such further monomers are present in an amount less than 5%, preferably less than 2.5%, more preferably less than 1%, by weight. Examples of suitable further monomers include vinyl esters of $C_1$-$C_{18}$ alkanoic acids, vinyl esters of aromatic acids, esters of ethylenically unsaturated acids other than acrylic or methacrylic acid, olefins, dienes, vinylaromatics, (meth) acrylonitrile and vinylhalogenides. Preferably, however, the monomer mixture excludes such further monomers so that the total percentages of the comonomers (a) to (d) add up to 100% of the monomer mixture.

In some embodiments, the relative amounts of the comonomers described above are selected so that the final copolymer has a glass transition temperature, $T_g$, from −10° C. to +50° C., preferably from 0 to +30° C. as determined by differential scanning calorimetry (DSC) according to ISO 16805.

In some embodiments, the copolymer dispersion comprises at least two different copolymer phases 1 and 2 with $T_{g1}$ and $T_{g2}$, where the difference between $T_{g1}$ and $T_{g2}$ is at least 10° C., preferably at least 30° C., as determined by differential scanning calorimetry (DSC) according to ISO 16805.

Stabilization System

Both during polymerization and thereafter, the present copolymer is stabilized in the form of an aqueous copolymer dispersion or latex. The copolymer dispersion therefore will be prepared in the presence of and will contain a stabilization system which generally comprises emulsifiers, in particular nonionic emulsifiers and/or anionic emulsifiers and/ or protective colloids. Mixtures of the different stabilizers can also be employed.

The amount of emulsifier employed will generally be at least 0.5 wt. %, based on the total quantity of monomers in the copolymer dispersion. Generally emulsifiers can be used in amounts up to about 8 wt. %, based on the total quantity of main monomers in the copolymer dispersion. Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers. Preferably also the emulsifiers used contain no alkylphenolethoxylate (APEO) structural units.

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically up to about 8% by weight, preferably up to about 5% by weight, more preferably up to about 4% by weight, based on the total monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium alkyl sulfate, sulfated alkyl or aryl ethoxylate with EO degree between 1 and 30, for example ethoxylated sodium lauryl ether sulfate or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols. Particularly suitable are sodium or potassium alkyl sulfates such as sodium lauryl sulfate, and sodium, potassium or ammonium salts of sulfated $C_{10}$-$C_{16}$ alkyl ethoxylates with an EO degree between 1 and 30.

The amount of anionic emulsifiers used can typically range from about 0.1% to about 3.0% by weight, preferably from about 0.1% to about 2.0% by weight, more preferably from about 0.5% to about 1.5% by weight, based on the total monomer quantity. Mixtures of anionic emulsifiers can also be employed.

Also suitable as stabilizers for the present dispersions are copolymerizable nonionic and anionic surfactants such as those disclosed in US 2014/0243552. Other suitable copolymerizable surfactants are sold under the trade names Hitenol® BC, Hitenol® KH, Hitenol® AR, Adeka Reasoap SR, and Adeka Reasoap ER.

Along with emulsifiers, the aqueous copolymer dispersions employed in accordance with the present development may also comprise as part of the stabilizer system a selected type of protective colloid based on cellulose ethers, poly vinyl alcohol, poly vinyl pyrolidone, polyacrylic acid, maleic acid styrene copolymers or other water soluble polymers. Suitable protective colloids used in the copolymer dispersions herein include water-soluble or water-dispersible polymeric modified natural substances based on cellulose ethers. Such cellulose ethers have a viscosity, when tested as a 1 wt. % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers. Carboxymethyl cellulose (CMC) is most preferred, as described in U.S. Pat. No. 4,492,780.

Hydrophobically modified cellulose ethers may also be employed as the protective colloid in the copolymer dispersions herein. Such materials comprise cellulose ethers which have been hydrophobically modified with long chain hydrocarbon groups to reduce their water solubility. Hydrophobically modified cellulose ethers of this type are those described, for example, in U.S. Pat. Nos. 4,228,277; 4,352,916 and 4,684,704; all of which patents are incorporated herein by reference.

The protective colloids can be used individually or in combination. In the case of combinations, the two or more colloids can each differ in their molecular weights or they can differ in their molecular weights and in their chemical composition, such as the degree of hydrolysis, for example.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.7% by weight.

In a particularly preferred variant, the present dispersions neither contain protective colloids nor nonionic emulsifiers.

In addition to the emulsifiers and protective colloids that are used during the emulsion polymerization of the copolymers herein, it is also possible to add further emulsifiers, protective colloids and/or other stabilizers after the polymerization.

Production of the Copolymer Dispersion

The desired copolymer dispersion is produced by free radical emulsion polymerization of the monomers described above in an aqueous medium and in the presence of one or more free radical initiators. The polymerization can be conducted either in a single stage or in multiple stages. The polymer produced in each stage may have a constant or a varying $T_g$. Preferably, the polymerization is conducted such that a dispersion with one defined $T_g$ is obtained. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents.

The polymerization temperature generally ranges from 20° C. to 150° C., more preferably from 50° C. to 120° C., most preferably from 60° C. to 95° C. The copolymerisation can be undertaken by batch, semi batch or continuous emulsions polymerization, i.e. by processes in which all the monomer is added upfront or by monomer slow add processes. Any reactor system such as batch, loop, continuous, cascade, etc. may be employed.

On completion of the polymerization, a further, preferably chemical after-treatment, especially with redox catalysts, for example combinations of the above-mentioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination uses both physical and chemical methods, which permits lowering of the residual monomers to very low contents (<1000 ppm, preferably <100 ppm).

The polymerized particles produced by the present process typically have a weight-averaged diameter of less than 200 nm, preferably less than 150 nm, more preferably less than 120 nm, as measured by a combination of laser diffraction and polarization intensity differential scattering (PIDS) using a Beckman Coulter LS 13320 Particle Size Analyzer.

In addition to monomers described herein, the final polymers may also contain a water-soluble or water-dispersible cross-linking agent. Such a cross-linking agent will react with specific polymer functionalities such as carbonyl or 1,3-dicarbonyl groups as water is removed from the coating compositions herein and as a film or coating is formed from the polymerized components.

A type of water-soluble cross-linking agent that can be used in the compositions herein comprises a compound which contains at least two hydrazine and/or hydrazide moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein, especially those produced from monomer compositions containing diacetone acrylamide (DAAM).

Other suitable water-soluble cross-linking agents are compounds which contain at least two amine functional moieties such as ethylene diamine and hexamethylene diamine. Such cross-linking agents are preferred in combination with polymers comprising 1,3-dicarbonyl groups, such as acetoacetoxyethyl methacrylate (AAEM).

Yet other suitable water-soluble or water-dispersable crosslinking agents are compounds comprising at least two oxazoline groups, as described in, e.g., WO 2015197662 A1, compounds comprising at least two groups with free or blocked isocyanate functionality, as described in, e.g., WO 2016118502 A1, compounds comprising at least two carbodiimide functional units, as described in, e.g., US 2015099843 A1, and compounds comprising at least two aminoxy-functional groups, as described in, e.g., WO 2015150508 A1.

Generally, such water-soluble cross-linking agents are post added to the dispersion such that the molar ratio of cross-linking agent functional groups to polymer functional groups is between about 0.1 and about 2.0. More preferably the molar ratio of cross-linking agent functional groups to copolymer functional groups in the blend will be between about 0.5 and 2.0.

After polymerization the dispersion is typically neutralized to alkaline pH. This can be accomplished by, for example, the addition of an organic or inorganic base, such as an amine, ammonia or an alkali metal hydroxide, such as potassium hydroxide. In some embodiments, it is preferred to effect neutralization with a nitrogen-free base.

In addition, before use, the copolymer dispersion can be dried to form a water redispersible powder, for example, to assist storage or transportation.

In some embodiments, the final copolymer dispersion has a biorenewable carbon content of at least 30%, preferably at least 50%, more preferably at least 65% by weight of the total carbon content of the copolymer dispersion according to ISO 16620-1.

Coating Compositions

The aqueous copolymer dispersion described herein is particularly useful as a binder for waterborne coating compositions, such as paints and plasters, having excellent wet scrub resistance and outdoor performance.

Where appropriate, the coating compositions used herein can also optionally comprise a wide variety of conventional additives, such as fillers, pigments, and auxiliaries including defoamers, surfactants, dispersants, biocides, rheology modifiers, freeze-thaw additives, formaldehyde scavenger like urea, complexing agents like EDTA or thickeners, which are typically used in the formulation of binders and/or adhesives. Such optional additives may be present in the copolymer dispersion from the beginning of or during polymerization, may be added to the dispersion post-polymerization or, such as in the case of fillers, may be used in connection with preparation of the aqueous coating compositions from the copolymer dispersions as hereinafter described.

In one embodiment, conventional optional additives for the copolymer dispersions herein can include, for example, film-forming assistants, such as white spirit, Texanol®, TxiB®, butyl glycol, butyl diglycol, butyl dipropylene glycol, and butyl tripropylene glycol; wetting agents, such as AMP 90®, TegoWet 280®, Fluowet PE®; defoamers, such as mineral oil defoamers or silicone defoamers; UV protectants, such as Tinuvin® 1130; agents for adjusting the pH; preservatives; plasticizers, such as dimethyl phthalate, diisobutyl phthalate, diisobutyl adipate, Coasol B®, Plastilit 3060®, and Triazetin®; subsequently added stabilizing polymers, such as polyvinyl alcohol or additional cellulose ethers; and other additives and auxiliaries of the kind typical for the formulation of binders. The amounts of these additives used in the aqueous copolymer dispersions herein can vary within wide ranges and can be selected by the specialist in view to the desired area of application. Preferred coating compositions contain less than 0.5% of coalescent agents or organic solvents.

The aqueous copolymer dispersions according to the invention are used, for example, as binders in pigment-containing, aqueous preparations which serve for the coating of substrates. Preferred coating compositions include emulsion paints, emulsion finishes and glazes. Paint formulations may include low emission interior or exterior paints. In the context of using the aqueous copolymer dispersions in coating compositions, a particular feature of the aqueous copolymer dispersions is the ability to confer a very good wet scrub resistance over a broad range of pigment volume concentrations (PVC). In case of exterior paints such as façade paints, the low water uptake of the inventive polymer dispersions enhances the outdoor durability of the paints, in particularly with regard to their resistance against fungal and algal attack.

In one embodiment, the coating composition may comprise from 30 to 90% of at least one filler, from 0.1 to 25% of at least one pigment, and from 5 to 60%, preferably from 5 to 50% of the aqueous copolymer dispersion based on a solid content of 50% of the present invention. The coating composition may also comprise one or more components selected from the group consisting of defoamers, surfactants, dispersants, biocides, rheology modifiers, freeze-thaw additives, and thickeners.

The copolymer dispersions as hereinbefore described may be combined with filler material, particularly inorganic filler material, additional water and/or any optional other ingredients, such as one or more auxiliaries, to form the aqueous coating compositions herein. The solids content of the aqueous compositions so formed will generally range from about 30 wt. % to about 75 wt. % of the total composition. More preferably, the solids content of the aqueous coating compositions herein will range from about 40 wt. % to about 65 wt. % of the total composition. These are to be understood as meaning all constituents of the preparation except for water, but at least the total amount of solid binder, filler, pigment, plasticizer and polymeric auxiliaries.

The pigment volume concentration (PVC) of the pigment-containing, aqueous preparations according to the invention is in general above 5%, preferably in the range from 10 to 90%. In particularly preferred embodiments, the PVCs are either in the range from 10 to 45% or in the range from 60 to 90%.

Pigments which may be used are all pigments known to the person skilled in the art for said intended use. Preferred pigments for the aqueous preparations according to the invention, preferably for emulsion paints, are, for example, titanium dioxide, preferably in the form of rutile, barium sulfate, zinc oxide, zinc sulfide, basic lead carbonate, antimony trioxide and lithopone (zinc sulfide and barium sulfate). The aqueous preparations may also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the preparations according to the invention may also contain organic colored pigments, for example sepia, gamboge, Cassel brown, toluidine red, para red, Hansa yellow, indigo, azo dyes, anthraquinoid and indigoid dyes and dioxazine, and quinacridone, phthalocyanine, isoindolinone and metal complex pigments.

Fillers which may be used are all fillers known to the person skilled in the art for said intended use. Preferred fillers are aluminosilicates, such as, for example, feldspars, silicates, such as, for example, kaolin, talc, mica, magnesite, alkaline earth metal carbonates, such as, for example, calcium carbonate, for example in the form of calcite or chalk, magnesium carbonate, dolomite, alkaline earth metal sulfates, such as, for example, calcium sulfate, and silica. The fillers can be used either as individual components or as filler mixtures. Filler mixtures, such as, for example, calcium carbonate/kaolin and calcium carbonate/talc, are preferred in practice.

In order to increase the hiding power and to save white pigments, finely divided fillers, such as, for example, precipitated calcium carbonate or mixtures of different calcium carbonates having different particle sizes, are preferably frequently used in emulsion paints. Mixtures of colored pigments and fillers are preferably used for adjusting the hiding power of the hue and the depth of color.

The customary auxiliaries include wetting agents or dispersants, such as sodium, potassium, or ammonium polyphosphates, alkali metal and ammonium salts of polyacrylic acids and of polymaleic acid, polyphosphonates, such as sodium 1-hydroxyethane-1,1-diphosphonate, and naphthalenesulfonic acid salts, in particular sodium salts thereof. In addition, suitable amino alcohols, such as, for example, 2-amino-2-methylpropanol, may be used as dispersants. The dispersants or wetting agents are preferably used in an amount of from 0.1 to 2% by weight, based on the total weight of the emulsion paint.

Furthermore, the auxiliaries may also comprise thickeners, for example cellulose derivatives, such as methylcellulose, hydroxyethylcellulose and carboxymethylcellulose, and furthermore casein, gum Arabic, tragacanth gum, starch, sodium alginate, polyvinyl alcohol, polyvinylpyrrolidone, sodium polyacrylates, water-soluble copolymers based on acrylic and (meth)acrylic acid, such as acrylic acid/acrylamide and (meth)acrylic acid/acrylic ester copolymers and so-called associative thickeners, such as styrene/maleic anhydride polymers or preferably hydrophobically modified polyetherurethanes (HEUR) known to the person skilled in the art, hydrophobically modified acrylic acid copolymers (HASE) or polyetherpolyols. Inorganic thickeners, such as, for example, bentonites or hectorite, may also be used. The thickeners are preferably used in amounts of from 0.1 to 3% by weight, particularly preferably from 0.1 to 1% by weight, based on the total weight of the aqueous preparation.

In addition, waxes based on paraffins and polyethylene, and dulling agents, antifoams, preservatives and water repellents, biocides, fibers, and further additives known to the person skilled in the art may also be used as auxiliaries in the aqueous preparations according to the invention.

The dispersions according to the invention can be used to produce not only solvent- and plasticizer-free preparations but also coating systems which contain solvents and/or plasticizers as film formation auxiliaries. Film formation auxiliaries are generally known to the person skilled in the art and can be used generally in amounts of from 0.1 to 20% by weight, based on the vinyl ester copolymer present in the preparation, so that the aqueous preparation has a minimum film formation temperature of less than 15° C., preferably less than 10° C., most preferably equal or less than 5° C. In a preferred embodiment, the aqueous preparations according to the invention contain no film formation auxiliary. In this case, the coating composition may have a minimum film forming temperature of less than or equal to 5° C. without addition of film forming agents.

The aqueous preparations according to the invention are stable fluid systems which can be used for coating a multiplicity of substrates. Consequently, the present invention also relates to methods for coating substrates and to the coating materials themselves. Suitable substrates are, for example, wood, concrete, mineral substrates, metal, glass, ceramics, plastic, renders, wallpapers, paper and coated, primed or weathered substrates. The application of the preparation to the substrate to be coated is effected in a manner dependent on the form of the preparation. Depending on the viscosity and the pigment content of the preparation and on the substrate, the application can be effected by means of roll-coating, brushing, knife-coating or as a spray.

When used as paints, the coating compositions of the invention exhibit excellent wet scrub resistance and typically achieve at least a wet scrub class III according to EN 13300 after only 7 days of drying.

When used as an external plaster, the coating composition of the invention may have a copolymer content of 8 to 20 wt. % based on a 50% solids dispersion and may be used as a top coat in an exterior insulation finishing system (EIFS).

The invention will now be more particularly described with reference to the following, non-limiting Examples.

Example 1 (Comparative)

A 3 liter reactor equipped with a reflux condenser and an anchor stirrer was filled with 660 g of deionized (DI) water and 21.4 g of a 28% aqueous solution of a sodium $C_{11}$-alkyl ether sulfate with approx. 7 ethylene oxide (EO) units. The reactor content was heated to 80° C. and 2.4% of the monomer feed, as described in Table 1, was added. A solution of 0.6 g sodium persulfate in 12 g of water was added and the reactor contents were held at 80° C. for 15 min. Subsequently, the remaining amount of monomer feed was added to the reactor with constant dosage rate over 180 min. The reactor temperature during the feed addition was maintained at 80° C. After completion of the feed addition, the reactor content was held at 85° C. for 60 minutes and then cooled to room temperature. 180 g of caustic soda (5%) were then added to the dispersion.

The properties of the resulting polymer dispersion are summarized in Table 2.

Examples 2-5 (Inventive)

The process of example 1 was repeated with varying monomer feed compositions, as described in Table 1. To the dispersion of Example 5, 60 g of a 10% aqueous solution of adipic dihydrazide were post-added.

The properties of the resulting polymer dispersions are summarized in Table 2.

TABLE 1

Composition of the monomer feeds (in grams)

|  | Ex. 1 | Ex. 2 | Ex. 3 | Ex. 4 | Ex. 5 |
|---|---|---|---|---|---|
| DI water | 535 | 535 | 535 | 535 | 535 |
| Sodium $C_{11}$-alkyl ether sulfate, 28% in water | 43 | 43 | 43 | 43 | 43 |
| Sodium persulfate | 3 | 3 | 3 | 3 | 3 |
| Methacrylic acid (MAA) | 24 | 24 | 24 | 24 | 24 |
| Acrylic acid (AA) | 12 | 12 | 12 | 12 | 12 |
| Isobornylmethacrylate (IBOMA) | 0 | 504 | 408 | 408 | 408 |
| Methyl methacrylate (MMA) | 564 | 0 | 0 | 0 | 0 |
| 2-Ethylhexyl acrylate (EHA) | 636 | 696 | 0 | 0 | 0 |
| 2-Octylacrylate | 0 | 0 | 792 | 792 | 792 |
| Triethoxyvinylsilane | 0 | 0 | 0 | 9 | 0 |
| Glycidyl methacrylate | 0 | 0 | 0 | 12 | 0 |
| Diacetone acrylamide | 0 | 0 | 0 | 0 | 12 |

TABLE 2

Properties of the polymer dispersions

|  | Solid content (%)[1] | Brookfield viscosity (mPa s)[2] | pH | Biobased carbon content $x_B^{TC}(\%)$[3] | $d_w$ (nm)[4] | $T_g$ (° C.)[5] | MFT (° C.)[6] |
|---|---|---|---|---|---|---|---|
| Example 1 | 45.8 | 230 | 8.2 | 0 | 120 | 6.4 | 0 |
| Example 2 | 46.1 | 540 | 7.8 | 30.1 | 110 | 1.6 | 0 |

TABLE 2-continued

Properties of the polymer dispersions

| | Solid content (%)[1] | Brookfield viscosity (mPa s)[2] | pH | Biobased carbon content $x_B^{TC}$(%)[3] | $d_w$ (nm)[4] | $T_g$ (° C.)[5] | MFT (° C.)[6] |
|---|---|---|---|---|---|---|---|
| Example 3 | 46.1 | 540 | 7.8 | 70.2 | 110 | 5.4 | 0 |
| Example 4 | 45.7 | 506 | 8.0 | 69.3 | 110 | 5.1 | 0 |
| Example 5 | 45.2 | 464 | 8.0 | 69.5 | 110 | 4.3 | 0 |

[1]gravimetric determination after 24 h drying at 110° C.
[2]measurement conditions: 20° C., 20 rpm, spindle 2
[3]according to ISO 16620-1. The biobased carbon contents of IBOMA and 2-octyl acrylate are 71.4% and 72.7%, respectively, due to their alcohol part stemming from renewable sources. All other raw materials stem from fossil sources.
[4]weight-average particle diameter as determined by a Beckman Coulter LS 13320 Particle Size Analyzer
[5]Glass transition temperature as measured by differential scanning calorimetry (DSC) according to ISO 16805.
[6]The minimum film forming temperature (MFT) is defined as the lowest temperature at which a polymer dispersion coalesces when laid on a substrate as a thin film, thereby forming clear transparent film.

Dried films of polymer dispersions take up water when immersed in the latter. The magnitude of the gravimetric water uptake can be used to assess the hydrophilicity of dispersion films. For façade paints, hydrophobic dispersion films are preferably used as polymeric binders, exhibiting a low water uptake preferably below 10%. To assess the magnitude of the water uptake of the inventive and comparative dispersion films, 30 g of the aqueous dispersion are cast into a Teflon® disc with a diameter of approx. 170 mm. If needed, 30 g of aqueous dispersion may be diluted with 10 g of water prior to casting to facilitate levelling of the film. The films are then dried at 50° C. in a cabinet dryer for 7 days. The Teflon® discs are stored horizontally to achieve a uniform dry film thickness of approx. 500 μm. The dispersion films are turned every two days to produce thoroughly dried films. Only immaculate films without cracks and air bubbles are used for testing. After drying, a 5×5 cm square is cut out of the polymer film and weighed ($m_{dry,1}$). It is then put in a petri dish and immersed in water for 24 h. After removing excess water, the weight of the film after water uptake is measured ($m_{wet,1}$). The first water uptake (%) is calculated by $100 \times (m_{wet,1} - m_{dry,1})/m_{dry,1}$. To determine the second water uptake, the same polymer film is dried for another two days to determine $m_{dry,2}$, then immersed in water for another 24 h to determine $m_{wet,2}$. The second water uptake is calculated according to the first water uptake. While the magnitude of the first water uptake can be used to assess the hydrophilicity of a new polymer film, the magnitude of the second water uptake quantifies the hydrophilicity of an aged polymer film.

The first and second water uptake of inventive and comparative dispersion films are shown in Table 3. As can be seen, both first and second water uptakes of the inventive dispersions 2-5 are significantly below 10%, while the respective values of the comparative dispersion 1 are in excess of 20%. Polymer films with <10% water uptake are regarded as exhibiting very good hydrophobicity.

TABLE 3

Water uptake of the polymer films

| | $1^{st}$ water uptake (%) | $2^{nd}$ water uptake (%) |
|---|---|---|
| Example 1 | 23 | 27 |
| Example 2 | 4 | 4 |
| Example 3 | 4 | 4 |
| Example 4 | 4 | 5 |
| Example 5 | 7 | 6 |

Examples 6-10 (Inventive and Comparative Matt Interior Paints)

Coalescent-free matt interior paints were prepared by mixing the ingredients in Table 4 at room temperature under stirring. After dissolving and dispersing pos. 2-5, pigment and fillers as per pos. 6-9 were dispersed consecutively by increasing the dissolver speed to 5000 rpm. After the preparation of the mill base, pos. 10-11 were added while gently stirring. The resulting paints had a solid content of approx. 63% and a pigment volume concentration (PVC) of approx. 77%.

TABLE 4

Composition of matt interior paints

| Pos. | | Supplier | Description | Parts per weight |
|---|---|---|---|---|
| 1 | Water | | | 283.5 |
| 2 | Tylose ® MH 30000 YG8 | SE Tylose | Cellulosic thickener | 4 |
| 3 | Calgon ® N, 10% | ICL | Dispersing agent | 5 |
| 4 | Lopon ® 895 | ICL | Dispersing agent | 3.5 |
| 5 | Agitan ® 381 | Münzing | Defoamer | 2 |
| 6 | Kronos ® 2044 | Kronos | Titanium dioxide | 80 |
| 7 | Polwhite B | Imerys | Kaolin | 35 |
| 8 | Omyacarb ® 2 GU | Omya | Calcium carbonate | 235 |
| 9 | Omyacarb ® 5 GU | Omya | Calcium carbonate | 205 |
| 10 | Caustic soda, 10% | | | 2 |
| 11 | Dispersion per Ex. 1-5 | | | 145 |

The wet scrub resistance (WSR) of the interior paints as per Examples 6-10 was tested by means of the nonwoven pad method according to ISO 11998. The paints were applied onto Leneta foil P121-10N with a 300 am scraper. After drying for 7 and 28 days at 23° C. and 50% relative humidity, respectively, the paint films were inserted into abrasion tester model 494 (Erichsen) with adapters for wet scrub tests according to ISO 11998 and scrubbed with Scotch-Brite™ Handpad 7448, Type S Ultra Fine (3M) after treatment of pad and film with a 0.25% aqueous solution of sodium n-dodecylbenzenesulfonate. Reported is the thickness loss of the paint film in μm after 200 cycles and the corresponding classification according to EN 13300 (Table 5).

TABLE 5

Wet scrub resistance of interior paints

| Ex. | Dispersion as per Ex. | WSR ISO 11998 (μm) | | EN 13300 class | |
|---|---|---|---|---|---|
| | | 7 d | 28 d | 7 d | 28 d |
| 6 | 1 (comp.) | 81 | 62 | IV | III |
| 7 | 2 (inv.) | 29 | 29 | III | III |
| 8 | 3 (inv.) | 31 | 21 | III | III |
| 9 | 4 (inv.) | 22 | 11 | III | II |
| 10 | 5 (inv.) | 26 | 24 | III | III |

Paints 7-10 comprising the inventive polymer dispersions 2-5 exhibit significantly reduced thickness losses compared to the comparative paint 6. This enables the inventive paints to achieve wet scrub class III according to EN 13300 even after only 7 days of drying.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. An aqueous copolymer dispersion comprising at least one copolymer formed by emulsion polymerization of a monomer mixture consisting of:
   (a) 20 to 80% by weight of one or more acrylic and/or methacrylic acid esters A, whose homopolymer(s) have a glass transition temperature, $T_g$, greater than 25° C. and at least one of which has a biorenewable carbon content of at least 50% by weight of the total carbon content of the ester, wherein the acrylic and/or methacrylic acid ester A having a biorenewable carbon content of at least 50% is selected from the group consisting of isobornyl acrylate, isobornyl methacrylate and mixtures thereof;
   (b) 19 to 79% by weight of one or more acrylic and/or methacrylic acid esters B whose homopolymer(s) have a glass transition temperature, $T_g$, less than 25° C.;
   (c) 0.5 to 10% by weight of at least one monomer selected from the group consisting of ethylenically unsaturated sulfonic acids, ethylenically unsaturated phosphonic acids, ethylenically unsaturated phosphoric acids, ethylenically unsaturated carboxylic acids, ethylenically unsaturated carboxylic amides, ethylenically unsaturated carboxylic anhydrides and mixtures thereof;
   (d) up to 10% by weight of one or more functional monomers selected from the group of hydrolysable silane compounds, epoxy-containing compounds, ureido-containing compounds and carbonyl-containing compounds, and
   (e) optionally one or more further monomers selected from the group consisting of vinyl esters of C1-C18 alkanoic acids, vinyl esters of aromatic acids, esters of ethylenically unsaturated acids other than acrylic or methacrylic acid, olefins, dienes, (meth)acrylonitrile and vinylhalogenides, copolymerizable with the (meth)acrylic esters A and B in an amount less than 5% by weight.

2. The dispersion of claim 1, wherein the acrylic and/or methacrylic acid ester A has a biorenewable carbon content of at least 50% by weight of the total carbon content of the ester.

3. The dispersion of claim 1, wherein at least one of the acrylic and/or methacrylic acid ester(s) B has a biorenewable carbon content of at least 50% by weight of the total carbon content of the ester.

4. The dispersion of claim 3, wherein the acrylic and/or methacrylic ester B having a biorenewable carbon content of at least 50% is selected from the group consisting of 2-octyl acrylate, n-dodecyl methacrylate, n-dodecyl acrylate, tridecyl methacrylate methacrylic ester, and mixtures thereof.

5. The dispersion of claim 3, wherein the acrylic and/or methacrylic ester B having a biorenewable carbon content of at least 50% comprises 2-octyl acrylate.

6. The dispersion of claim 1, wherein the acrylic and/or methacrylic acid ester B has a biorenewable carbon content of at least 50% by weight of the total carbon content of the ester.

7. The dispersion of claim 1, wherein the copolymer dispersion has a biorenewable carbon content of at least 30% by weight of the total carbon content of the copolymer dispersion according to ISO 16620.

8. The dispersion of claim 1, wherein the mixture comprises 25 to 75% by weight of the acrylic and/or methacrylic acid ester(s) A.

9. The dispersion of claim 1, wherein the total percentages of the comonomers (a) to (d) add up to 100%.

10. The dispersion of claim 1, wherein the at least one copolymer has a glass transition temperature, $T_g$, from −10° C. to +50° C. as determined by differential scanning calorimetry (DSC) according to ISO 16805.

11. The dispersion of claim 1 wherein the copolymer dispersion comprises at least two different copolymer phases 1 and 2 with $T_{g1}$ and $T_{g2}$, where the difference between $T_{g1}$ and $T_{g2}$ is at least 10° C. as determined by differential scanning calorimetry (DSC) according to ISO 16805.

12. A water redispersible powder comprising a dried form of the dispersion of claim 1.

13. A coating composition comprising the dispersion of claim 1.

14. The coating composition of claim 13 and further comprising at least one inorganic filler.

15. The coating composition of claim 13 and comprising less than 0.5% of coalescent agents or organic solvents.

16. The coating composition of claim 13, whose film exhibits a weight increase of less than 10% after immersion in water for 24 hours.

17. An interior paint comprising the dispersion of claim 1 and at least one inorganic filler.

18. An exterior paint comprising the dispersion of claim 1 and at least one inorganic filler.

19. An exterior plaster comprising the dispersion of claim 1 and at least one inorganic filler.

20. The exterior plaster of claim 19 with a copolymer content of 8 to 20 wt. % based on a 50% solids dispersion.

21. An exterior insulation finishing system (EIFS) comprising a plaster according to claim 19 as a top coat.

22. An aqueous copolymer dispersion comprising at least one copolymer formed by emulsion polymerization of a monomer mixture comprising:
- (a) 20 to 80% by weight of one or more acrylic and/or methacrylic acid esters A, whose homopolymer(s) have a glass transition temperature, $T_g$, greater than 25° C. and at least one of which has a biorenewable carbon content of at least 50% by weight of the total carbon content of the ester, wherein the acrylic and/or methacrylic acid ester A having a biorenewable carbon content of at least 50% is selected from the group consisting of isobornyl acrylate, isobornyl methacrylate and mixtures thereof;
- (b) 19 to 79% by weight of one or more acrylic and/or methacrylic acid esters B whose homopolymer(s) have a glass transition temperature, $T_g$, less than 25° C.;
- (c) 0.5 to 10% by weight of at least one monomer selected from the group consisting of ethylenically unsaturated sulfonic acids, ethylenically unsaturated phosphonic acids, ethylenically unsaturated phosphoric acids, ethylenically unsaturated carboxylic acids, ethylenically unsaturated carboxylic amides, ethylenically unsaturated carboxylic anhydrides and mixtures thereof; and
- (d) up to 10% by weight of one or more functional monomers selected from the group of hydrolysable silane compounds, epoxy-containing compounds, ureido-containing compounds and carbonyl-containing compounds, wherein the total percentages of the comonomers (a) to (d) in the monomer mixture add up to 100%.

* * * * *